(12) United States Patent
Tani et al.

(10) Patent No.: US 9,946,921 B2
(45) Date of Patent: Apr. 17, 2018

(54) MONITORING DEVICE, MONITORING METHOD AND MONITORING PROGRAM

(71) Applicant: NEC Corporation, Minato-ku, Tokyo (JP)

(72) Inventors: Masahiro Tani, Tokyo (JP); Osamu Houshuyama, Tokyo (JP); Takafumi Koshinaka, Tokyo (JP); Ryoma Oami, Tokyo (JP); Hiroyoshi Miyano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 61 days.

(21) Appl. No.: 14/786,742

(22) PCT Filed: Jan. 28, 2014

(86) PCT No.: PCT/JP2014/000425
§ 371 (c)(1),
(2) Date: Oct. 23, 2015

(87) PCT Pub. No.: WO2014/174738
PCT Pub. Date: Oct. 30, 2014

(65) Prior Publication Data
US 2016/0078286 A1 Mar. 17, 2016

(30) Foreign Application Priority Data
Apr. 26, 2013 (JP) ................. 2013-093214

(51) Int. Cl.
*G06K 9/00* (2006.01)
*G10L 25/48* (2013.01)
(Continued)

(52) U.S. Cl.
CPC .......... *G06K 9/00335* (2013.01); *G01S 3/802* (2013.01); *G06K 9/00778* (2013.01);
(Continued)

(58) Field of Classification Search
CPC G06K 9/00335; G06K 9/00778; G01S 3/802; G10L 25/48; H04N 5/772; H04N 5/77
See application file for complete search history.

(56) References Cited

U.S. PATENT DOCUMENTS 7,433,493 B1 * 10/2008 Miyoshi ............. G06K 9/00771
348/E7.087
8,665,333 B1 * 3/2014 Sharma .............. G06K 9/00771
348/135
(Continued)

FOREIGN PATENT DOCUMENTS

JP 2000-092368 A 3/2000
JP 2002-044647 A 2/2002
(Continued)

OTHER PUBLICATIONS

International Search Report for PCT Application No. PCT/JP2014/000425, dated Feb. 25, 2014.
(Continued)

*Primary Examiner* — Mishawn Hunter

(57) ABSTRACT

A monitoring device includes a crowd behavior analysis unit 21 and an abnormality degree calculation unit 24. The crowd behavior analysis unit 21 specifies a behavior pattern of a crowd from input video. The abnormality degree calculation unit 24 calculates an abnormality degree from a change of the behavior pattern.

17 Claims, 4 Drawing Sheets

(51) Int. Cl.
*G01S 3/802* (2006.01)
*H04N 5/77* (2006.01)

(52) U.S. Cl.
CPC ............. *G10L 25/48* (2013.01); *H04N 5/772* (2013.01); *H04N 5/77* (2013.01)

(56) References Cited

U.S. PATENT DOCUMENTS

| | | | | |
|---|---|---|---|---|
| 9,036,902 | B2* | 5/2015 | Nathan | G06K 9/00771 |
| | | | | 382/159 |
| 2005/0039206 | A1* | 2/2005 | Opdycke | G06Q 30/02 |
| | | | | 725/35 |
| 2005/0286860 | A1* | 12/2005 | Conklin | H04H 60/33 |
| | | | | 386/228 |
| 2007/0121999 | A1* | 5/2007 | Ma | G06K 9/00342 |
| | | | | 382/103 |
| 2008/0059988 | A1* | 3/2008 | Lee | G06Q 30/02 |
| | | | | 725/9 |
| 2014/0270388 | A1* | 9/2014 | Lucey | G06T 7/2033 |
| | | | | 382/107 |
| 2014/0372348 | A1* | 12/2014 | Lehmann | G06K 9/6265 |
| | | | | 706/12 |
| 2016/0132754 | A1* | 5/2016 | Akhbardeh | G06T 7/20 |
| | | | | 382/103 |

FOREIGN PATENT DOCUMENTS

| | | |
|---|---|---|
| JP | 2002-344957 A | 11/2002 |
| JP | 2006-339741 A | 12/2006 |
| JP | 2012-022370 A | 2/2012 |
| JP | 2012-058944 A | 3/2012 |
| JP | 2013-073477 A | 4/2013 |

OTHER PUBLICATIONS

Japanese Office Action for JP Application No. 2015-513498 dated Dec. 12, 2017 with English Translation.
Tomio Echigo et al. "Person image processing", Ohm-Sha, Ltd., 1st edition, Dec. 15, 2007, p. 234-237.
Japanese Office Action for JP Application No. 2015-513498 dated Feb. 13, 2018 with English Translation.

* cited by examiner

MONITORING DEVICE, MONITORING METHOD AND MONITORING PROGRAM

This application is a National Stage Entry of PCT/JP2014/000425 filed on Jan. 28, 2014, which claims priority from Japanese Patent Application 2013-093214filed on Apr. 26, 2013, the contents of all of which are incorporated herein by reference, in their entirety.

TECHNICAL FIELD

The present invention relates to a monitoring device, monitoring method, and monitoring program for monitoring crowd behavior using input video.

BACKGROUND ART

Video captured by installed cameras is monitored to perform various determination. One such determination concerns whether or not the situation of a captured monitoring target is an event that needs to be observed.

For example, Patent Literature (PTL) 1 describes a method of detecting abnormal situations that occur on general roads or expressways, in parking areas, etc. In the method described in PTL 1, a received acoustic signal is analyzed to determine whether or not to capture an image and, in the case of determining that an image needs to be captured, an imaging device is controlled so that its imaging range includes the device that has received the acoustic signal.

CITATION LIST

Patent Literature(s)

PTL 1: Japanese Patent Application Laid-Open No. 2002-44647

SUMMARY OF INVENTION

Technical Problem

The external environment typically contains a mixture of sounds that include not only the sound of a target to be monitored but also various sounds generated by equipment being driven, air conditioners, natural wind, and so on. Therefore, for example in the case where a sound collection device such as a microphone is installed in the external environment, various sounds other than that of the monitoring target enter the sound collection device.

With the method described in PTL 1, whether or not to capture an image is determined based on input acoustic signals. However, since various sounds are mixed in the environment in which acoustic signals are collected, the method of determining events based only on acoustic signals as in the method described in PTL 1 has a problem of lower determination accuracy. With such lower determination accuracy, it is difficult to determine to what extent an event that has occurred deviates from a normal state and how to respond to the event.

The present invention accordingly has an object of providing a monitoring device, monitoring method, and monitoring program capable of determining to what extent an event being monitored deviates from a normal state.

Solution to Problem

A monitoring device according to the present invention includes: a crowd behavior analysis unit which specifies a behavior pattern of a crowd from input video; and an abnormality degree calculation unit which calculates an abnormality degree from a change of the behavior pattern.

A monitoring method according to the present invention includes: specifying a behavior pattern of a crowd from input video; and calculating an abnormality degree from a change of the behavior pattern.

A monitoring program according to the present invention causes a computer to execute: a crowd behavior analysis process of specifying a behavior pattern of a crowd from input video; and an abnormality degree calculation process of calculating an abnormality degree from a change of the behavior pattern.

Advantageous Effects of Invention

According to the present invention, it is possible to determine to what extent an event being monitored deviates from a normal state.

DESCRIPTION OF EMBODIMENT(S)

The following describes exemplary embodiments of the present invention with reference to drawings.

Exemplary Embodiment 1

Figure 1:
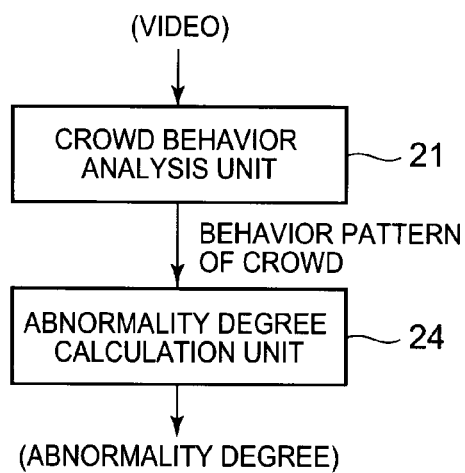
FIG. 1 It is a block diagram depicting a structural example of Exemplary Embodiment 1 of a monitoring device according to the present invention.

FIG. 1 is a block diagram depicting a structural example of Exemplary Embodiment 1 of a monitoring device according to the present invention. The monitoring device in this exemplary embodiment includes a crowd behavior analysis unit 21 and an abnormality degree calculation unit 24. The monitoring device receives information necessary for monitoring, from an imaging device (not depicted, e.g. a camera) for capturing the image of a monitoring range or a sound collection device (not depicted, e.g. a microphone) for collecting the sound of the monitoring range.

The crowd behavior analysis unit 21 receives input video from the imaging device, and specifies a behavior pattern of a crowd from the input video. The behavior pattern of the crowd is a classification that defines a change in crowd behavior during a given time period. This behavior change includes not only a state in which the behavior changes but also a state in which the behavior is unchanged. For example, the behavior pattern of the crowd is defined by the moving direction and the amount of change of the moving direction, the moving speed and the amount of change of the moving speed, the crowd scattering degree (dispersion) and the amount of change of the crowd scattering degree, and any combination thereof. The information for defining the behavior pattern of the crowd is, however, not limited to these information.

The time period (time interval) used when specifying the crowd pattern is set beforehand depending on the process. For example, the time interval may be one frame of input video. Hereafter, a behavior pattern during a given time period may also be referred to simply as a behavior pattern at a given time t, for simplicity's sake.

The crowd is a group of individuals as monitoring targets. In this exemplary embodiment, the individuals as monitoring targets include not only persons alone but also, for example, persons moving by car, motorcycle, bicycle, or the like. For example, the crowd behavior analysis unit 21 may, after recognizing individual monitoring targets, determine the group of the monitoring targets as a crowd. Alternatively, the crowd behavior analysis unit 21 may learn each crowd pattern appearing in video beforehand, and compare input video with the pattern to determine a crowd.

As an example, the crowd behavior analysis unit 21 may set each crowd behavior pattern detectable from video beforehand, and analyze whether or not the behavior pattern is included in input video. As another example, the crowd behavior analysis unit 21 may learn and model each crowd behavior pattern, and specify a crowd behavior pattern using a discriminator for determining the likelihood of each behavior pattern from the model. Here, the crowd behavior analysis unit 21 may also specify the plausibility (likelihood) of the crowd behavior pattern.

Moreover, for example in the case where input video includes a behavior pattern which has not been registered, the crowd behavior analysis unit 21 may determine that the video includes a behavior pattern of a state deviating from a normal state. In detail, having set a behavior pattern indicating a steady state beforehand, the crowd behavior analysis unit 21 may determine that the input video includes an abnormal behavior pattern in the case where the video includes a behavior pattern that does not correspond to the steady state. The behavior pattern that does not correspond to the steady state includes a behavior pattern in input video whose likelihood of being the behavior pattern indicating the steady state is below a predetermined threshold as a result of comparison.

Typically, it is often difficult to learn each individual state that deviates from a normal state. In view of this, specifying any state that deviates from such a steady state enables monitoring of various abnormal states.

In the following description, a state that deviates from a normal state is referred to as an abnormal state, and the degree of deviation from the normal state as an abnormality degree. The term "abnormality" in this exemplary embodiment includes not only a state that deviates from the normal state in an undesirable direction but also a state that deviates from the normal state in a desirable direction.

The method by which the crowd behavior analysis unit 21 specifies the behavior pattern of the crowd is not limited to the above-mentioned methods. Moreover, the crowd behavior analysis unit 21 may not only determine the specific behavior pattern of the crowd, but also calculate the moving direction of the crowd and the amount of change of the movement based on the video feature quantity calculated from the input video. Here, the crowd behavior analysis unit 21 may use information representing apparent movement such as optical flow, as the video feature quantity.

The abnormality degree calculation unit 24 calculates the abnormality degree from the behavior pattern of the crowd specified by the crowd behavior analysis unit 21. In detail, the abnormality degree calculation unit 24 calculates the abnormality degree depending on the crowd behavior pattern that changes temporally.

Figure 2:
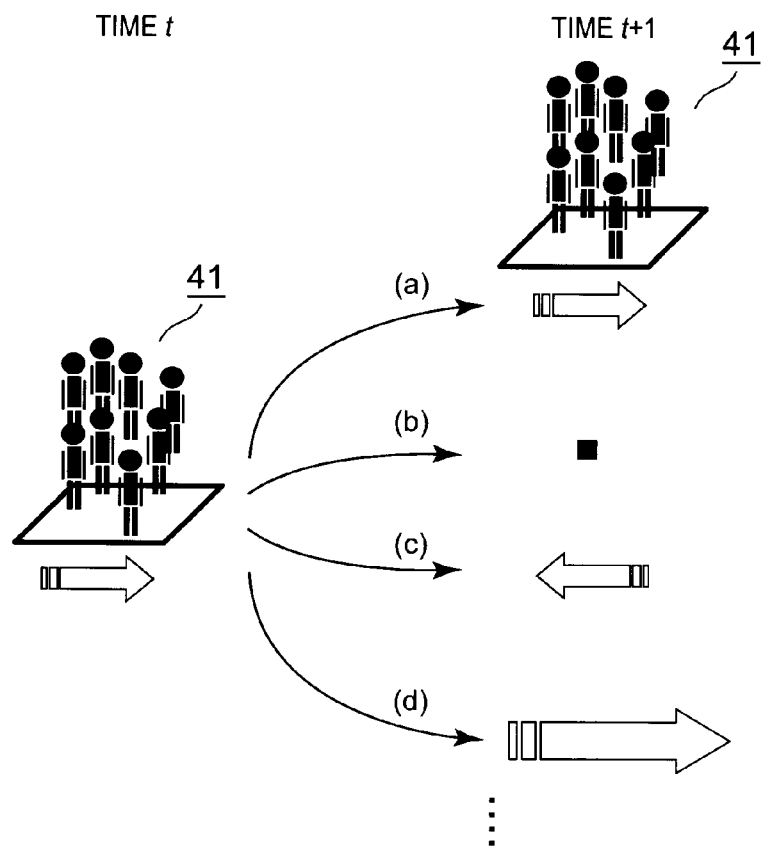
FIG. 2 It is an explanatory diagram depicting an example of a method of calculating an abnormality degree.

FIG. 2 is an explanatory diagram depicting an example of a method of calculating an abnormality degree. In the example depicted in FIG. 2, the crowd behavior pattern at time t indicates that a crowd 41 is moving in the right direction at constant speed. The abnormality degree calculation unit 24 compares the crowd behavior pattern at time t and the crowd behavior pattern at time t+1, and specifies the change of the crowd behavior pattern.

As an example, suppose the crowd 41 is moving in the right direction at constant speed at time t+1 as at time t, as depicted in (a) in FIG. 2. In this case, the crowd behavior pattern is unchanged, and so the abnormality degree calculation unit 24 may calculate a low abnormality degree.

As another example, suppose the movement of the crowd 41 stops at time t+1, as depicted in (b) in FIG. 2. In this case, for example, it is assumed that an event causing the crowd 41 to stop and check the situation, such as an accident or an earthquake, has occurred. In the case where the crowd behavior pattern changes in such a way, the abnormality degree calculation unit 24 may calculate a medium abnormality degree.

As another example, suppose the movement of the crowd 41 changes at time t+1 so that the crowd 41 moves in the opposite direction (the left direction) at constant speed, as depicted in (c) in FIG. 2. In this case, for example, it is assumed that an event causing the crowd 41 to change the moving direction in order to check an accident or the like having taken place to the left has occurred. In the case where the crowd behavior pattern changes in such a way, the abnormality degree calculation unit 24 may calculate a medium abnormality degree.

As another example, suppose the moving speed of the crowd 41 changes greatly at time t+1, as depicted in (d) in FIG. 2. In this case, for example, it is assumed that an event causing the crowd 41 to suddenly run away, such as a terrorist attack, has occurred. In the case where the crowd behavior pattern changes in such a way, the abnormality degree calculation unit 24 may calculate a high abnormality degree.

When calculating the abnormality degree, the abnormality degree calculation unit 24 may use a value set beforehand depending on the change of the crowd behavior pattern, as the abnormality degree. In the case where the crowd behavior analysis unit 21 calculates the likelihood of the crowd behavior pattern, for example, the abnormality degree calculation unit 24 may calculate the abnormality degree by multiplying a predetermined value by the likelihood. In other words, the abnormality degree calculation unit 24 may calculate a higher abnormality degree when the likelihood is higher.

For example, even in the case where the type of the change of the crowd behavior pattern is the same, the abnormality degree calculation unit 24 may calculate a higher abnormity degree when the amount of change is larger. The amount of change of the behavior pattern can be calculated based on the change of the moving speed of the crowd or the change of the moving direction of the crowd. A sudden change of the behavior pattern seems to indicate the occurrence of an event that deviates more from the normal state. In this case, the abnormality degree calculation unit 24 may calculate, from the change of the crowd behavior pattern, the amount of change of the pattern, and calculate a higher abnormality degree when the amount of change is larger.

The abnormality degree calculation unit 24 may change the abnormality degree calculation method depending on the environment in which the monitoring device in this exemplary embodiment is applied. For example, in the case where an unusual event in the environment being monitored occurs, the situation in which such an event occurs can be regarded as a situation that deviates more from the normal state. Hence, the abnormality degree calculation unit 24 may calculate the abnormality degree using a function that calculates a higher abnormality degree when the event corresponds to a crowd behavior pattern change with lower occurrence frequency. Here, the abnormality degree calculation unit 24 may store the occurrence frequency as a history, and determine the occurrence frequency using the history.

Moreover, in the case where the crowd behavior analysis unit 21 specifies an abnormal behavior pattern, the abnormality degree calculation unit 24 may calculate the distance between the temporal change of the abnormal behavior pattern and the temporal change of the behavior pattern indicating the steady state, as the abnormality degree.

The abnormality degree calculation unit 24 may control various devices for monitoring and warn monitoring personnel or a monitoring system, depending on the calculated abnormality degree. In detail, given that a higher abnormality degree requires more intense monitoring, different levels of processes may be set according to the abnormality degree so that the abnormality degree calculation unit 24 executes a process associated with the calculated abnormality degree. For example, the abnormality degree calculation unit 24 may issue an alarm to the monitoring personnel or monitoring system, in the case where the calculated abnormality degree exceeds a predetermined threshold or depending on the degree of deviation from a predetermined value.

The method of controlling each device for monitoring depending on the abnormality degree is not limited to the above-mentioned methods. For example, the calculated abnormality degree may be notified to a system (not depicted) for controlling each device for monitoring so that the system controls each device for monitoring depending on the notified abnormality degree.

The crowd behavior analysis unit 21 and the abnormality degree calculation unit 24 are realized by a CPU of a computer operating according to a program (monitoring program). For example, the program may be stored in a storage unit (not depicted) in the monitoring device, with the CPU reading the program and, according to the program, operating as the crowd behavior analysis unit 21 and the abnormality degree calculation unit 24. Alternatively, the crowd behavior analysis unit 21 and the abnormality degree calculation unit 24 may each be realized by dedicated hardware.

Figure 3:
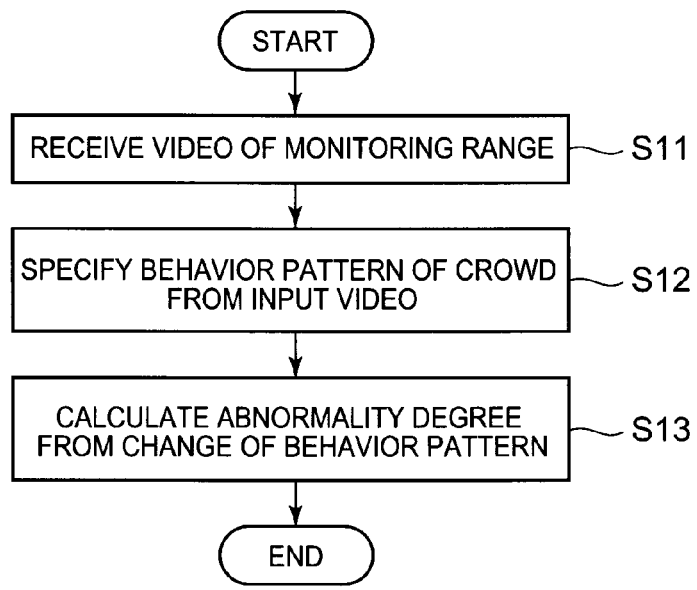
FIG. 3 It is a flowchart depicting an operation example of the monitoring device in Exemplary Embodiment 1.

The following describes an example of the operation of the monitoring device in this exemplary embodiment. FIG. 3 is a flowchart depicting an operation example of the monitoring device in this exemplary embodiment. The imaging device (not depicted) captures the video of the monitoring range, and supplies the video to the monitoring device (step S11). The crowd behavior analysis unit 21 specifies the behavior pattern of the crowd from the input video (step S12). The abnormality degree calculation unit 24 calculates the abnormality degree from the change of the behavior pattern (step S13).

As described above, according to this exemplary embodiment, the crowd behavior analysis unit 21 specifies the behavior pattern of the crowd from the input video, and the abnormality degree calculation unit 24 calculates the abnormality degree from the change of the behavior pattern. It is thus possible to determine to what extent an event being monitored deviates from a normal state.

Exemplary Embodiment 2

Figure 4:
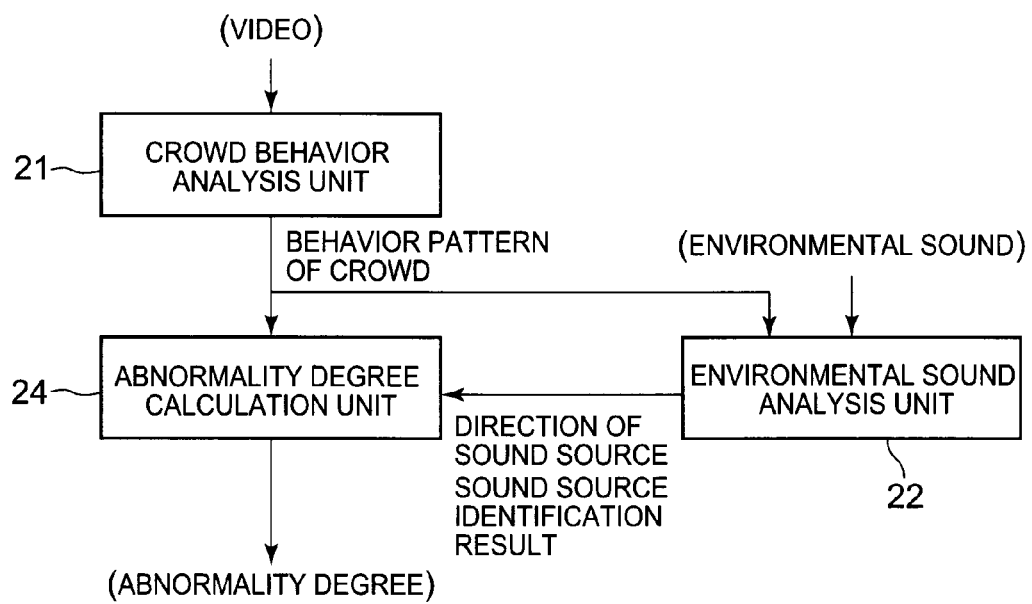
FIG. 4 It is a block diagram depicting a structural example of Exemplary Embodiment 2 of the monitoring device according to the present invention.

FIG. 4 is a block diagram depicting a structural example of Exemplary Embodiment 2 of the monitoring device according to the present invention. The same structural elements as those in Exemplary Embodiment 1 are given the same reference signs as in FIG. 1, and their description is omitted. The monitoring device in this exemplary embodiment includes the crowd behavior analysis unit 21, an environmental sound analysis unit 22, and the abnormality degree calculation unit 24. Thus, the monitoring device in this exemplary embodiment differs from the monitoring device in Exemplary Embodiment 1 in that the environmental sound analysis unit 22 is included.

The environmental sound analysis unit 22 receives the sound of the monitoring range (hereafter referred to as environmental sound), from the sound collection device (e.g. a microphone). The environmental sound analysis unit 22 analyzes any sound source included in the received environmental sound. In detail, the environmental sound analysis unit 22 analyzes the sound source detected from the monitoring range, and determines the direction of the sound source and identifies the type of the sound source, the loudness of the sound source, etc. The result of identifying the details of the sound source, such as the type of the sound source and the loudness of the sound source, is hereafter referred to as the sound source identification result.

The environmental sound analysis unit 22 may, for example, analyze a sound source indicating an abnormal situation. Examples of the sound source indicating the abnormal situation include a scream, a vehicle sound (e.g. engine sound, exhaust sound, slip sound), an explosion sound, a gunshot sound, and a sound of breaking glass. The environmental sound analysis unit 22 may identify the details of the sound source using a well-known method.

The environmental sound analysis unit 22 may specify the type of the sound source using the behavior pattern of the crowd specified by the crowd behavior analysis unit 21. For example, sounds generated by a bomb, a firecracker, and a firework are all explosion sounds, and have similar acoustic features. Suppose a bomb causes damage to objects or people, whereas a firecracker and a firework attract people as in a festival. It is then assumed that the presence of a bomb causes the crowd to move greatly, and the presence of a firecracker or a firework causes the crowd to stop and watch. By taking the behavior pattern of the crowd into consideration, the environmental sound analysis unit 22 can specify the type of the sound source with improved accuracy even in the case where the sound source has a similar acoustic feature to other sound sources.

The method whereby the environmental sound analysis unit 22 determines the direction of the sound source and the method whereby the environmental sound analysis unit 22 identifies the details of the sound source are not limited to the above-mentioned methods. The environmental sound analysis unit 22 may determine the direction of the sound source and identify the details of the sound source using other widely known methods.

The environmental sound analysis unit 22 may supply the sound source analysis result, such as the direction of the sound source and the sound source identification result, to the abnormality degree calculation unit 24 on a regular basis. Alternatively, the environmental sound analysis unit 22 may, upon recognizing a sound source of a predetermined type (e.g. a sound source indicating an abnormal situation), supply the result of recognizing the sound source and the direction of the sound source to the abnormality degree calculation unit 24. The environmental sound analysis unit 22 is, for example, realized by a CPU of a computer operating according to a program (monitoring program).

The abnormality degree calculation unit 24 calculates the abnormality degree based on the direction of the sound source or the sound source identification result. The abnormality degree calculation unit 24 may calculate the abnormality degree, for example, from the sound source identification result indicating the details of the detected sound source and the change of the crowd behavior pattern before and after the sound source is detected. The abnormality degree calculation unit 24 may calculate the abnormality degree, for example, from the direction of the detected sound source and the change of the crowd behavior pattern before and after the sound source is detected.

Figure 5:
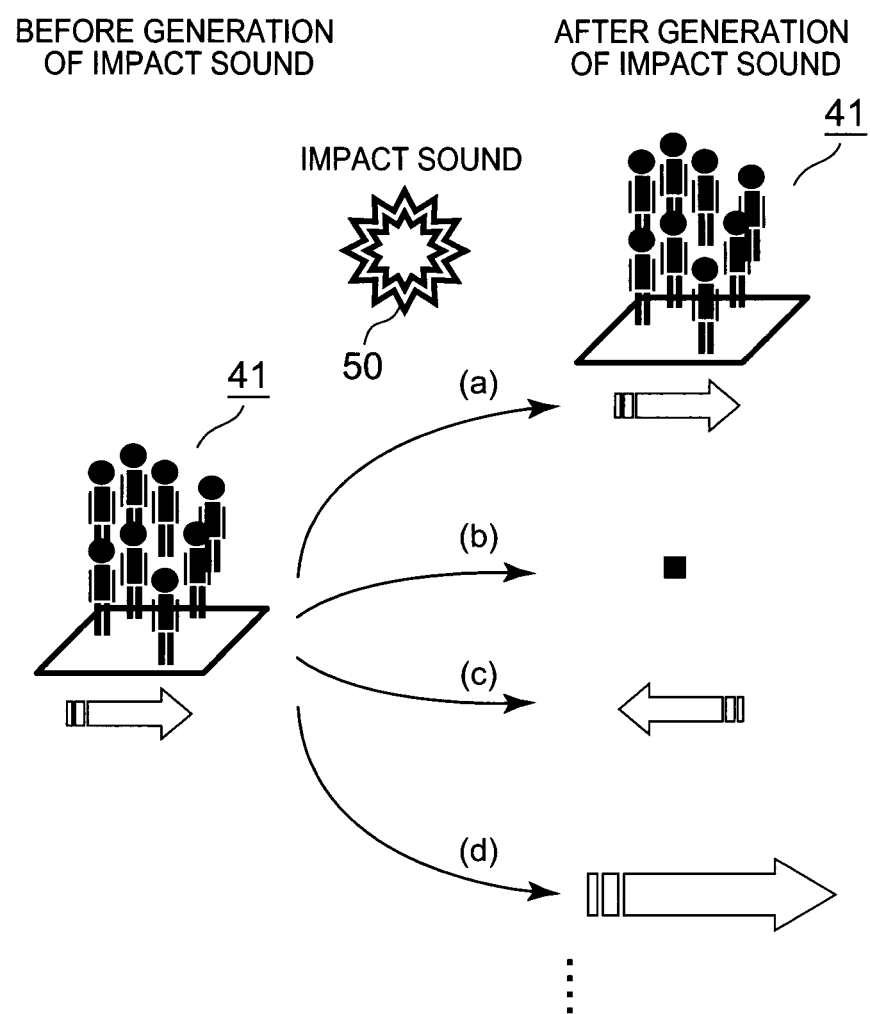
FIG. 5 It is an explanatory diagram depicting an example of another method of calculating an abnormality degree.

FIG. 5 is an explanatory diagram depicting an example of another method of calculating an abnormality degree. FIG. 5 depicts an example of the method of calculating the abnormality degree from the change of the crowd behavior pattern before and after the sound source is detected. In the example depicted in FIG. 5, the crowd behavior pattern before the generation of an impact sound 50 indicates that a crowd 41 is moving in the right direction at constant speed.

As an example, suppose the crowd 41 is moving in the right direction at constant speed before and after the generation of the impact sound 50, as depicted in (a) in FIG. 5. In this case, the crowd behavior pattern is unchanged, and so it is assumed that a minor accident or false sound source detection has occurred. Accordingly, the abnormality degree calculation unit 24 may calculate a low abnormality degree.

As another example, suppose the movement of the crowd 41 stops after the generation of the impact sound 50, as depicted in (b) in FIG. 5. In this case, for example, it is assumed that an event causing the crowd to stop and check the situation, such as an accident or an earthquake, has occurred. In the case where the crowd behavior pattern changes in such a way before and after the generation of the impact sound 50, the abnormality degree calculation unit 24 may calculate a medium abnormality degree.

As another example, suppose the movement of the crowd 41 changes after the generation of the impact sound 50 so that the crowd 41 moves in the opposite direction (the left direction) at constant speed, as depicted in (c) in FIG. 5. In this case, for example, it is assumed that an event causing the crowd 41 to change the moving direction in order to check an accident or the like having taken place to the left has occurred. In the case where the crowd behavior pattern changes in such a way before and after the generation of the impact sound 50, the abnormality degree calculation unit 24 may calculate a medium abnormality degree.

As another example, suppose the moving speed of the crowd 41 changes greatly after the generation of the impact sound 50, as depicted in (d) in FIG. 5. In this case, for example, it is assumed that an event causing the crowd 41 to suddenly run away, such as a terrorist attack, has occurred. In the case where the crowd behavior pattern changes in such a way before and after the generation of the impact sound 50, the abnormality degree calculation unit 24 may calculate a high abnormality degree.

The method whereby the abnormality degree calculation unit 24 calculates the abnormality degree is not limited to the method depicted as an example in FIG. 5. For example, the abnormality degree calculation unit 24 may calculate the abnormality degree by the method described in Exemplary Embodiment 1 or the combination of these methods.

The abnormality degree calculation unit 24 may calculate the abnormality degree using both the sound source identification result indicating the details of the detected sound source and the direction of the detected sound source. For example, the abnormality degree calculation unit 24 may set beforehand each abnormality degree depending on a behavior pattern when a certain type of sound source is detected from a certain direction, and calculate the abnormality degree depending on the direction and type of the detected sound source and the likelihood of the specified behavior pattern. Here, the abnormality degree calculation unit 24 may calculate a higher abnormality degree when the likelihood is higher.

Figure 6:
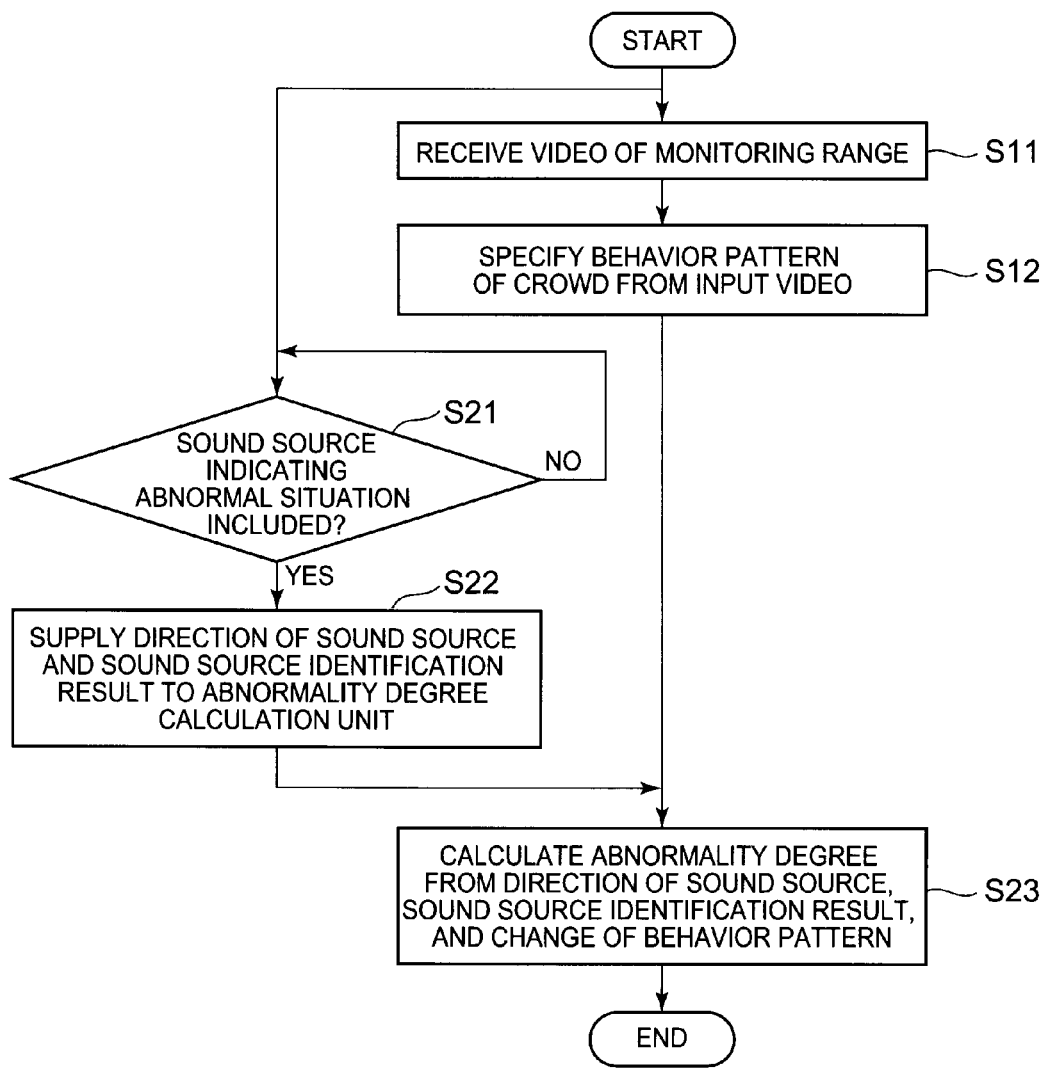
FIG. 6 It is a flowchart depicting an operation example of the monitoring device in Exemplary Embodiment 2.

The following describes the operation of the monitoring device in this exemplary embodiment. FIG. 6 is a flowchart depicting an operation example of the monitoring device in this exemplary embodiment. The processes of steps S11 to S12 in which the video of the monitoring range is captured and supplied to the monitoring device and the behavior pattern of the crowd is specified from the input video are the same as the processes depicted in FIG. 3.

The environmental sound analysis unit 22 analyzes the environmental sound, and determines whether nor not the environmental sound includes a sound source indicating an abnormal situation (step S21). In the case of determining that the environmental sound does not include a sound source indicating an abnormal situation (step S21: No), the environmental sound analysis unit 22 repeats the process of step S21. In the case where the environmental sound includes a sound source indicating an abnormal situation (step S21: Yes), the environmental sound analysis unit 22 supplies the direction of the sound source and the sound source identification result to the abnormality degree calculation unit 24 (step S22).

The abnormality degree calculation unit 24 calculates the abnormality degree from the change of the behavior pattern. In the case where the direction of the sound source and the sound source identification result are notified from the environmental sound analysis unit 22, the abnormality degree calculation unit 24 may calculate the abnormality degree from the direction of the sound source, the sound source identification result, and the change of the behavior pattern (step S23).

As described above, according to this exemplary embodiment, the environmental sound analysis unit 22 analyzes the sound source detected from the monitoring range and calculates at least one of the direction of the sound source and the sound source identification result indicating the details of the sound source, and the abnormality degree calculation unit 24 calculates the abnormality degree based on the direction of the sound source or the sound source identification result. It is thus possible to improve the accuracy in determining to what extent an event being monitored deviates from a normal state, in addition to the advantageous effects of Exemplary Embodiment 1.

For example, in the method described in PTL 1, the significance of the event or the like is determined based only on the sound source identification result. In this exemplary embodiment, on the other hand, the event is determined based on not only the sound source identification result but also the behavior pattern specified from the video. This improves the accuracy in determining the significance of the event.

The following describes an overview of the present invention with reference to FIG. 1. A monitoring device according to the present invention includes: a crowd behavior analysis unit 21 which specifies a behavior pattern of a crowd from input video; and an abnormality degree calculation unit 24 which calculates an abnormality degree (e.g. a degree of deviation from a normal state) from a change of the behavior pattern.

With such a structure, it is possible to determine to what extent an event being monitored deviates from a normal state.

The monitoring device may include a sound source analysis unit (e.g. an environmental sound analysis unit 22) which analyzes a sound source detected from a monitoring range, and calculates at least one of a direction of the sound source and a sound source identification result indicating details of the sound source. The abnormality degree calculation unit 24 may calculate the abnormality degree, based on the change of the behavior pattern and the direction of the sound source or the sound source identification result.

With such a structure, the accuracy in determining to what extent an event being monitored deviates from a normal state can be further improved. In other words, since not only the behavior pattern of the crowd but also the sound that seems to have triggered the behavior pattern is used in the determination, the accuracy in calculating the abnormality degree of the event being monitored can be further improved.

The sound source analysis unit may calculate at least one of the direction of the sound source and the sound source identification result, using the behavior pattern of the crowd. The use of the behavior pattern of the crowd improves the accuracy in determining the detected sound source.

In detail, the abnormality degree calculation unit 24 may calculate the abnormality degree from: information which is at least one of the direction of the detected sound source and the sound source identification result; and the change of the behavior pattern of the crowd before and after the sound source is detected. With such a structure, the accuracy in determining whether or not the detected sound source corresponds to an abnormal event can be improved.

The abnormality degree calculation unit 24 may calculate an amount of the change of the behavior pattern of the crowd, and calculate a higher abnormality degree when the amount of the change is larger. This is based on an assumption that an event with a large amount of change in behavior pattern is an event that deviates more from the normal state.

The abnormality degree calculation unit 24 may calculate a higher abnormality degree when an occurrence frequency of the change of the behavior pattern of the crowd is lower. This is based on an assumption that an event in which an unusual change in behavior pattern occurs is an event that deviates more from the normal state.

The crowd behavior analysis unit 21 may calculate a likelihood indicating plausibility of the behavior pattern of the crowd. The abnormality degree calculation unit 24 may then calculate a higher abnormality degree when the likelihood is higher.

The abnormality degree calculation unit 24 may issue an alarm to at least a predetermined control process (e.g. a control process of each device for monitoring) or a predetermined destination (e.g. monitoring personnel or a monitoring system), depending on the calculated abnormality degree.

Although the present invention has been described with reference to the foregoing exemplary embodiments and examples, the present invention is not limited to the foregoing exemplary embodiments and examples. Various changes understandable by those skilled in the art within the scope of the present invention can be made to the structures and details of the present invention.

This application claims priority based on Japanese Patent Application No. 2013-093214 filed on Apr. 26, 2013, the disclosure of which is incorporated herein in its entirety.

REFERENCE SIGNS LIST 21 crowd behavior analysis unit
22 environmental sound analysis unit
24 abnormality degree calculation unit
41 crowd
50 impact sound

What is claimed is:

1. A monitoring device comprising:
a crowd behavior analysis unit which specifies a behavior pattern of a crowd from input video;
an abnormality degree calculation unit which calculates an abnormality degree from a change of the behavior pattern; and
a sound source analysis unit which analyzes a sound source detected from a monitoring range, and calculates at least one of a direction of the sound source and a sound source identification result indicating details of the sound source,
wherein the abnormality degree calculation unit calculates the abnormality degree, based on the change of the behavior pattern and the direction of the sound source or the sound source identification result.

2. The monitoring device according to claim 1, wherein the sound source analysis unit calculates at least one of the direction of the sound source and the sound source identification result, using the behavior pattern of the crowd.

3. The monitoring device according to claim 2, wherein the abnormality degree calculation unit calculates the abnormality degree from: information which is at least one of the direction of the detected sound source and the sound source identification result; and the change of the behavior pattern of the crowd before and after the sound source is detected.

4. The monitoring device according to claim 1, wherein the abnormality degree calculation unit calculates the abnormality degree from: information which is at least one of the direction of the detected sound source and the sound source identification result; and the change of the behavior pattern of the crowd before and after the sound source is detected.

5. The monitoring device according to claim 1, wherein the abnormality degree calculation unit calculates an amount of the change of the behavior pattern of the crowd, and calculates a higher abnormality degree when the amount of the change is larger.

6. The monitoring device according to claim 1, wherein the abnormality degree calculation unit calculates a higher abnormality degree when an occurrence frequency of the change of the behavior pattern of the crowd is lower.

7. The monitoring device according to claim 1, wherein the crowd behavior analysis unit calculates a likelihood indicating plausibility of the behavior pattern of the crowd, and
wherein the abnormality degree calculation unit calculates a higher abnormality degree when the likelihood is higher.

8. The monitoring device according to claim 1, wherein the abnormality degree calculation unit issues an alarm to at least a predetermined control process or a predetermined destination, depending on the calculated abnormality degree.

9. The monitoring device according to claim 1, wherein the abnormality degree calculation unit calculates an amount of the change of the behavior pattern of the crowd, and calculates a higher abnormality degree when the amount of the change is larger.

10. The monitoring device according to claim 1, wherein the abnormality degree calculation unit calculates a higher abnormality degree when an occurrence frequency of the change of the behavior pattern of the crowd is lower.

11. The monitoring device according to claim 1, wherein the crowd behavior analysis unit calculates a likelihood indicating plausibility of the behavior pattern of the crowd, and wherein the abnormality degree calculation unit calculates a higher abnormality degree when the likelihood is higher.

12. The monitoring device according to claim 1, wherein the abnormality degree calculation unit issues an alarm to at least a predetermined control process or a predetermined destination, depending on the calculated abnormality degree.

13. A monitoring method comprising:
specifying, using a processor, a behavior pattern of a crowd from input video;
calculating, using a processor, an abnormality degree from a change of the behavior pattern;
analyzing, using a processor, a sound source detected from a monitoring range, and calculating at least one of a direction of the sound source and a sound source identification result indicating details of the sound source; and
calculating, using a processor, the abnormality degree, based on the change of the behavior pattern and the direction of the sound source or the sound source identification result.

14. The monitoring method according to claim 13, comprising:
calculating at least one of the direction of the sound source and the sound source identification result, using the behavior pattern of the crowd.

15. The monitoring method according to claim 14, comprising:
calculating the abnormality degree from: information which is at least one of the direction of the detected sound source and the sound source identification result; and the change of the behavior pattern of the crowd before and after the sound source is detected.

16. The monitoring method according to claim 13, comprising:
calculating the abnormality degree from: information which is at least one of the direction of the detected sound source and the sound source identification result; and the change of the behavior pattern of the crowd before and after the sound source is detected.

17. A non-transitory computer readable information recording medium storing a monitoring program, when executed by a processor, that performs a method for:
specifying a behavior pattern of a crowd from input video;
calculating an abnormality degree from a change of the behavior pattern; and
analyzing a sound source detected from a monitoring range, and calculating at least one of a direction of the sound source and a sound source identification result indicating details of the sound source,
wherein the abnormality degree is calculated based on the change of the behavior pattern and the direction of the sound source or the sound source identification result.

* * * * *